(No Model.)

C. D. THATCHER.
CAP NUT.

No. 306,875. Patented Oct. 21, 1884.

WITNESSES:
Donn Twitchell.
C. Sedgwick

INVENTOR:
C. D. Thatcher
BY Munn & Co.
ATTORNEYS.

UNITED STATES PATENT OFFICE.

CHARLES D. THATCHER, OF COLUMBUS, ASSIGNOR, BY MESNE ASSIGNMENTS, OF ONE-HALF TO FINLEY O. CUMMINGS AND JOHN C. CHORPENNING, BOTH OF SPRINGFIELD, OHIO.

CAP-NUT.

SPECIFICATION forming part of Letters Patent No. 306,875, dated October 21, 1884.

Application filed March 12, 1884. (No model.)

*To all whom it may concern:*

Be it known that I, CHARLES D. THATCHER, of Columbus, in the county of Franklin and State of Ohio, have invented a new and Improved Cap-Nut, of which the following is a full, clear, and exact description.

My invention relates to headed screw caps or nuts designed more especially for use upon the top-props of carriages; and the invention consists, principally, in making the head of the nut separate from the main body of the nut or cap, these two parts being subsequently secured together by suitable means for completing the nut.

The invention also consists in forming the main body of the nut with claws at one end, and in forming the head with an undercut or dovetailed recess, into which the claws are adapted to be expanded by means of a beveled expanding plate for locking the head and main body of the nut together.

Reference is to be had to the accompanying drawings, forming part of this specification, in which similar letters of reference indicate corresponding parts in all the figures.

Figure 1:
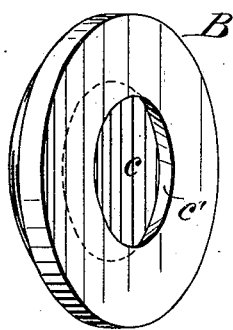
Figure 3:
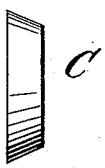
Figure 2:
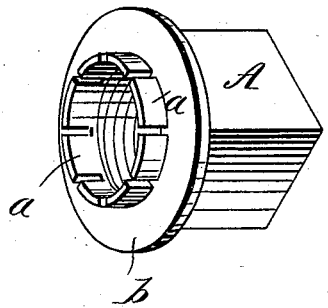
Figure 4:
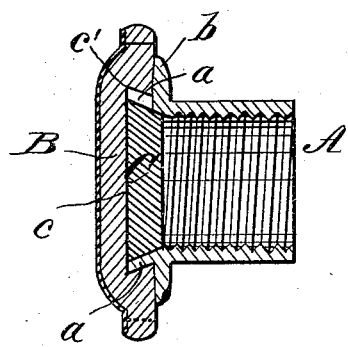

Figure 1 is a perspective view of the head of the nut. Fig. 2 is a perspective view of the body of the nut as it appears before the head is attached. Fig. 3 is a perspective view of the expanding-plate; and Fig. 4 is a sectional elevation of the nut complete.

A represents the metallic internally-screwthreaded body of the nut.

B represents the head of the nut, which may be of leather, metal, celluloid, hard rubber. papier-maché, or any other suitable material; and C represents the expanding plate.

The body A is formed at its upper end with the clinch plates or claws $a\ a$, and also with the flange $b$, which forms a seat for the head B when the main parts of the nut are united. The head B is recessed in its under surface, as shown at $c$, and this recess is of an external diameter to just fit over the claw-plates $a$, and is dovetailed or undercut at its edges, as shown at $c'$, for the secure engagement therewith of the claw-plates $a\ a$. The expander C is, in this instance, a circular plate formed with beveled edges, and of a size at its smaller diameter to just enter between the claw-plates $a$, the larger diameter of the plate C being equal to the greatest diameter of the recess $c$ in the head B less twice the thickness of one of the claw-plates $a$.

In uniting the parts of the nut, the expanding plate C is placed in the recess $c$ of the head B, with its smaller diameter standing outward. The claw-plates $a$ are then placed upon the expanding plate C, and the body A struck a heavy blow with a hammer or other implement. This will drive the claw-plates $a$ upon the beveled edges of the plate C, which will cause them to be expanded into the dovetailed recess $c$, as shown in Fig. 4, thus securely uniting the head B to the body A, making the complete nut.

By making the nut in the manner described, the head B may be made of any suitable material different from the material of the body, A, and it may be ornamented before attaching the head and body A together.

Having thus described my invention, what I claim as new, and desire to secure by Letters Patent, is—

1. In a cap-nut, the combination, with the body A, provided with the claws $a$, of the cap B, provided with the beveled recess $c\ c'$, and the expanding plate C, having beveled edges, substantially as herein shown and described.

2. The herein-described cap-nut, consisting of the body A, provided with claws $a$, the head or cap B, and the expanding plate C, as set forth.

CHARLES D. THATCHER.

Witnesses:
   M. R. SHANK,
   E. C. DINWIDDIE.